Figure 1:
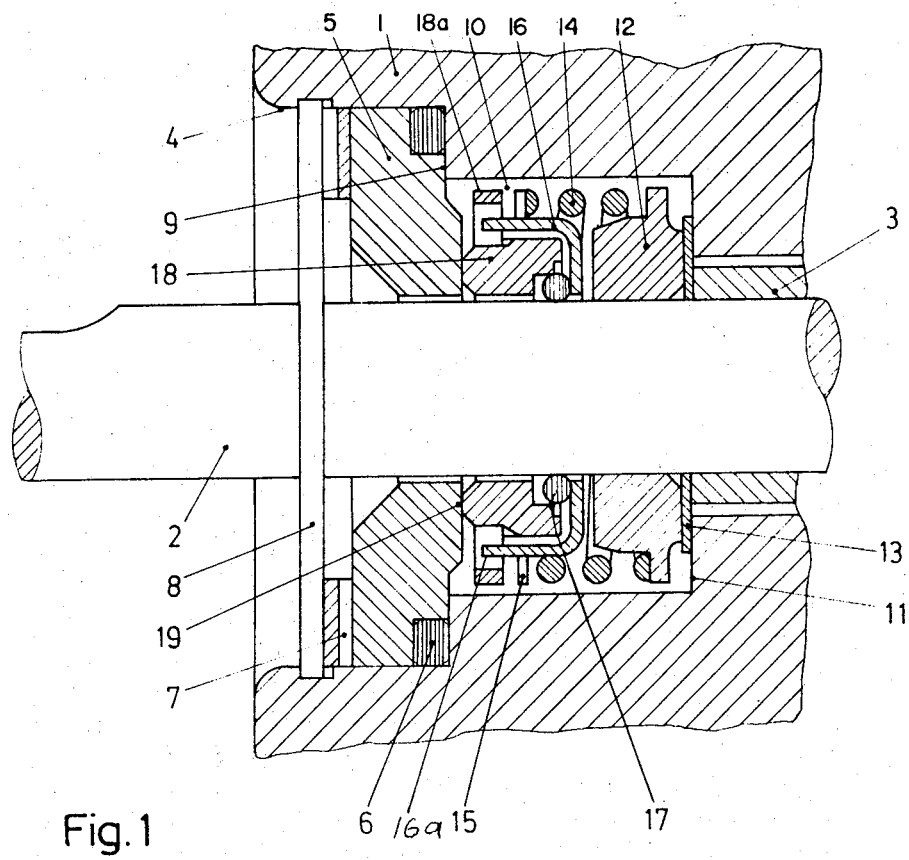

United States Patent

[11] 3,561,775

| [72] | Inventor | Leif V. Sturlason |
| | | Sonderborg, Denmark |
| [21] | Appl. No. | 729,984 |
| [22] | Filed | May 17, 1968 |
| [45] | Patented | Feb. 9, 1971 |
| [73] | Assignee | Danfoss A/S |
| | | Nordborg, Denmark |
| | | a company of Denmark |
| [32] | Priority | May 18, 1967 |
| [33] | | Germany |
| [31] | | D 53,111 |

[54] SEALING DEVICE COMPRISING AN O-RING
6 Claims, 2 Drawing Figs.

[52] U.S. Cl.................................................. 277/87,
277/93
[51] Int. Cl..................................................... F16j 15/38
[50] Field of Search............................................ 277/81,
84—88, 92, 93 (SD), 96—99, 38—43

[56] References Cited
UNITED STATES PATENTS
2,420,718  5/1947  Odelius .......................... 277/86

| 2,690,360 | 9/1954 | Young......................... | 277/168X |
| 3,013,823 | 12/1961 | Schulz......................... | 277/87X |
| 3,073,657 | 1/1963 | Oxford......................... | 277/92UX |

FOREIGN PATENTS
1,441,823  5/1966  France ......................  277/87

*Primary Examiner*—William F. O'Dea
*Assistant Examiner*—Edward J. Earls
*Attorneys*—Robert E. Burns and Emmanuel J. Lobato ABSTRACT: A sealing device comprises a component encircling a shaft with the component having a steeped circular groove coaxial with the shaft. The deeper portion of the groove is closer to the surface of the shaft than the shallower portion and the edge of the step defining the two portions is located at a distance from the surface of the shaft that is greater than the radius but smaller than the diameter of an O-ring received in the groove. Means are provided for loading the O-ring against the edge of the step and roll into the deeper portion of the groove thus effecting a seal between the component and the shaft.

SEALING DEVICE COMPRISING AN O-RING

The invention relates in general to sealing device and more particularly to rotary sealing devices incorporating O-rings.

Rotary sealing devices often comprise an O-ring which seals the gap between the cylindrical shaft and a component surrounding the shaft with the O-ring pressed in an axial direction into an annular groove in the component.

In sealing devices of this kind, the inner circumference of the O-ring gear on the cylindrical shaft and one of it end face gear on a corresponding side face of the groove of the components. The quality of such a seal depends on numerous factors, which cannot always be precisely controlled, such as inaccuracies in the dimensions of the ring, shaft and groove. Furthermore, the seam on the O-ring caused by the gap between the tools used for its manufacture, usually bears on the surface of the shaft.

An object of this invention is to provide a sealing device in which an O-ring always bears tightly on the component and shaft to give a proper seal.

Figure 2:
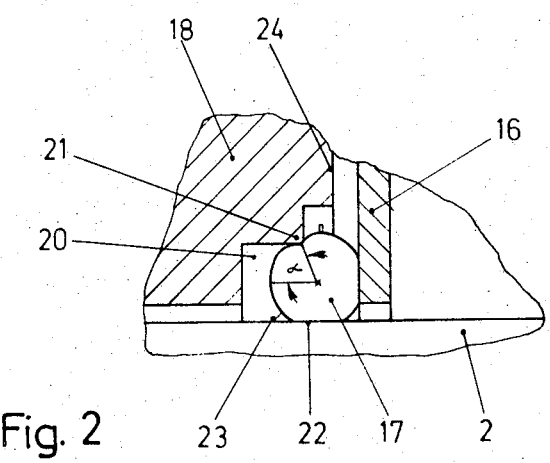

Other objects and a fuller understanding of the invention may be had by referring to the following description and claims, taken in conjunction with the accompanying drawings, in which:

FIG. 1 is a longitudinal cross-sectional view of a rotary seal incorporating the invention; and FIG. 2 is a fragmentary portion of the view of FIG. 1 showing the portions surrounding the O-ring on an enlarged scale.

With reference to the drawing, a shaft 2 is rotatably supported in a housing 1 by a bearing 3. Located in a recess 4 of the housing is an annular seat 5 which is sealed on the outside by means of a packing or O-ring 6. The seat 5 is pressed against the end face 9 of the recess 4 by a corrugated, or wave-type spring washer 7 which is supported against a snap-in ring 8. The rotating parts of the rotary seal are accommodated in a chamber 10 of the housing 1. A support ring 12 bears against the end face 11 of the chamber 10 with a bearing disc 13 interposed. A helical compression spring 14 extends between the support ring 12 and radially projecting fingers 15 of a dished spring washer 16 which presses against an O-ring and also on a rotating sealing ring 18, the end face 19 of which is pressed against the seat 5.

The force exerted by the spring 4 is much less than the strength of the spring washer 7. Axially projecting portions 16a of the dished washer 16 extend in openings in a radially projecting portion 18a of the sealing ring 18 to assure that the dished water and sealing ring rotate together.

As FIG. 2 shows in more detail, the sealing ring 18 has an annular recess or groove 20 having a step or shoulder 21 which divides the groove into an axially deeper portion close to the shaft having a minor diameter and an axially shallower portion having a major diameter radially spaced from the shaft. The distance of the shoulder 21 from the circumference of the shaft 2 is smaller than the diameter of a circular cross section of the O-ring 17 but greater than its radius of a circular cross section. Preferably the shoulder 21 bears on a zone of the cross section of the O-ring such that a line connecting said zone and the center of the lies at an angle X of 45 —60° to the axial direction. With this angular dimension an optimum sealing effect is obtained on the component 18 and the shaft. It can be seen that the inner part of the ring rolls farther into the groove 20 under the influence of the spring washer 16, the shoulder 21 being the pivotal point. Due to the rolling movement, a good seal on the shaft is obtained in the region of the surface 22. Furthermore, the seam 23 on the ring is rolled out of a plane through the center of the O-ring and perpendicular to the axis of the shaft and no longer lies in that region where the seal of the O-ring with the shaft 2 is made. A face portion 24 is provided ahead of the shoulder 21 in the a axial direction, and the dished spring washer 16 bears against this face member if excessive axial pressure should occur, so that the O-ring 17 cannot be destroyed.

The O-ring 17 is formed of elastomeric material which is sufficiently resilient and flexible to conform to any surface irregularities and provide a fluid-tight seal and yet sufficiently firm to tend to retain its circular cross section so that under pressure of the spring-pressed washer 16, it is not squeezed wholly into the deeper part of the groove 20 but assumes a shape such as that shown in FIG. 2. Rubber or synthetic rubber compounds can satisfactorily be used. A material is selected which is not affected by oil or other liquid to which the ring is subjected. The packing ring 6 may also be made of suitable elastomeric material.

In this construction the O-ring bears on the shoulder of the component. Line contact results, or at least contact over a small area and under high pressure, so that a proper seal is ensured there. Furthermore, this shoulder provides a pivot about which the inner part of the O-ring, under axial pressure, rolls into the groove. Thus irrespective of the accuracy of the dimension of the inner diameter of the groove in regard to the diameter of the shaft, proper sealing on the shaft is achieved. Moreover, during the rolling movement, the inside seam is displaced somewhat from the plane perpendicular to the axis of the shaft, so that a portion that is free from defects bears upon the shaft.

The arrangement is suitable not only for rotary seals, but also for all known seals in which an O-ring is intended to seal the gap between a cylindrical shaft and a component surrounding it, and is loaded in the axial direction.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim:

1. A sealing device for sealing a shaft comprising, a rotatably driven shaft, a component encircling said shaft having an annular stepped open groove coaxial with said shaft and having a minor diameter and a major diameter, means defining a shoulder in said groove having an edge dividing said groove into a portion having the minor diameter and a portion having the major diameter, a deformable O-ring disposed circumferentially of said shaft, said edge being located at a distance radially from the surface of said shaft greater than a radius of a circular cross section of said O-ring and less than the diameter of said circular cross section of the O-ring, said portion of said groove having a major diameter being open to receive therein said O-ring, loading means disposed to press said O-ring axially in a direction into the last-mentioned portion of said groove against said edge so that said edge provides an annular pivot and said O-ring tends to seek to roll into said groove portion having the minor diameter and effects an annular fluid tight seal area on said component and an annular fluid tight seal area circumferentially of said shaft.

2. A sealing device according to claim 1, in which said major diameter is greater than the overall diameter of said O-ring.

3. A sealing device according to claim 2, in which said portion of the groove having the minor diameter is axially deeper than the portion of the groove having the major diameter.

4. A sealing device according to claim 1, wherein said groove and said O-ring are relatively proportioned so that a line connecting said edge of said shoulder and the center of the solid portion of said O-ring forms an angle with the axis of the shaft that is equal to or greater than 45° but less than or equal to 60°.

5. A sealing device according to claim 1, wherein said loading means comprise a spring-loaded plate disposed so as to bear against said O-ring and wherein portions of said component are disposed cooperate with plate to act act as stop means limiting the axial travel of the spring loaded plate in a direction toward said O-ring.

6. A sealing device according to claim 1, wherein said groove and said O-ring are relatively proportioned so that a line connecting said edge of said shoulder and the center of the solid portion of said O-ring forms an included angle with the axis of said shaft that is acute.